(12) United States Patent
Schmitt et al.

(10) Patent No.: US 6,278,606 B1
(45) Date of Patent: Aug. 21, 2001

(54) COMPUTER AND METHOD FOR EMI CONTAINMENT IN A COMPUTER

(75) Inventors: Ty Schmitt, Round Rock; Russell C. Smith, Pflugerville, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/226,759

(22) Filed: Jan. 6, 1999

(51) Int. Cl.[7] .................................................. G06F 1/16
(52) U.S. Cl. .................. 361/683; 312/223.2; 312/257.1; 312/263; 70/57
(58) Field of Search ........................ 361/679–687, 361/724–727; 312/223.2, 265.6, 265.5, 263, 293.3, 257.1; 70/57, 58

(56) References Cited

U.S. PATENT DOCUMENTS

| | | | |
|---|---|---|---|
| 3,915,530 | * 10/1975 | Anderson et al. | 312/257.1 |
| 4,655,057 | * 4/1987 | Derman | 70/58 |
| 5,011,418 | * 4/1991 | Perzentka, Jr. | 316/683 |
| 5,076,461 | * 12/1991 | Nichols | 70/58 |
| 5,117,661 | * 6/1992 | Carl et al. | 70/58 |
| 5,191,544 | * 3/1993 | Benck et al. | 361/683 |
| 5,199,776 | * 4/1993 | Lin | 312/293.3 |
| 5,236,259 | 8/1993 | Ryan et al. . | |
| 5,438,476 | 8/1995 | Steffes . | |
| 5,542,757 | * 8/1996 | Chang | 312/223.2 |
| 5,572,400 | * 11/1996 | Roesner et al. | 361/683 |
| 5,575,546 | 11/1996 | Radloff . | |
| 5,586,003 | 12/1996 | Schmitt et al. . | |
| 5,593,219 | * 1/1997 | Ho | 312/263 |
| 5,593,220 | * 1/1997 | Seid et al. | 312/265.6 |
| 5,677,511 | 10/1997 | Taylor et al. . | |
| 5,717,570 | 2/1998 | Kikinis . | |
| 5,724,227 | 3/1998 | Hancock et al. . | |
| 5,768,097 | * 6/1998 | Jelinger | 361/683 |
| 5,777,398 | * 7/1998 | Valkeakari et al. . | |
| 5,880,931 | * 3/1999 | Tilton et al. | 312/223.2 |
| 6,069,789 | * 4/2000 | Jung | 361/684 |
| 6,102,501 | * 8/2000 | Chen et al. | 312/223.2 |

FOREIGN PATENT DOCUMENTS

3608057A1 * 9/1987 (DE) ................ H05K/5/02

* cited by examiner

Primary Examiner—Gerald Tolin
Assistant Examiner—Lisa Lea-Edmonds
(74) Attorney, Agent, or Firm—Haynes and Boone, L.L.P.

(57) ABSTRACT

A computer and a method of EMI containment in a computer chassis having peripheral bays formed in its chassis, and at least two openings formed in a wall of the chassis for providing access to the at least two bays, respectively. Covers are provided for the openings and each cover overlaps its respective opening and one of the covers overlaps the other cover. The covers are interlocked with tabs formed on one of the covers which engage recessed portions formed in the other cover.

8 Claims, 2 Drawing Sheets

COMPUTER AND METHOD FOR EMI CONTAINMENT IN A COMPUTER

BACKGROUND

The present disclosure relates, in general, to a computer, or other similar electronic component, and, more particularly, to a computer and method according to which electromagnetic interference is contained.

It is well known that during the operation of computers, or other similar electronic components, electromagnetic interference, (EMI) emissions, or radiation, are generated in the chassis of the computer by the motors, drives, processors, chips, circuits, etc. These emissions have deleterious effects and should be contained within the chassis. Moreover, in certain situations, these emissions must be contained in order to comply with certain regulations.

A great majority of computers are provided with several peripheral bays which can be accessed through an opening in the front wall, or bezel, and/or the rear wall of the chassis. When one or more of the bays are not in use, a "closeout", or cover, is usually placed over one of the above walls at the unused bays to prevent the egress of the EMI emissions from the interior of the chassis. However, although each cover is designed to completely cover a bay, gaps are often present around the covers, and especially in connection with two adjacent covers. These gaps are undesirable since they create a slot antenna gap though which the EMI emissions pass.

Therefore, what is needed is a cover for a peripheral bay in a computer, or other similar component, that eliminates any slot antenna gaps occurring around the shield and thus contains the emissions in the computer chassis.

SUMMARY

To this end, an embodiment of the present disclosure is directed to a computer and a method of EMI containment in a computer chassis having at least one wall, at least two peripheral bays formed in the chassis, and at least two openings formed in the wall for providing access to the at least two bays, respectively. A cover is provided for each opening and each cover overlaps its respective opening. One of the covers overlaps the other cover and is interlocked with the other cover by tabs formed on one of the covers which engage recessed portions formed in the other cover.

DESCRIPTION OF THE PREFERRED EMBODIMENT

Figure 1:
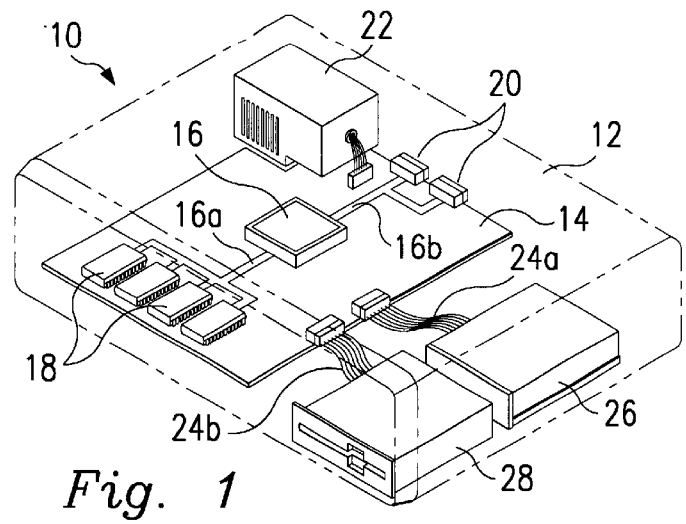
FIG. 1 is a diagramatic view of a computer according to an embodiment of the present invention.

An embodiment of the present invention is shown in FIG. 1 in connection with a computer, referred to, in general, by the reference numeral 10, which can be in the form of a server, a tower computer, a desktop computer, or the like. The computer 10 includes a chassis 12 in which a motherboard 14 is mounted. A processor 16 is connected to the motherboard 14, and a plurality of memory devices, or modules, 18 and two input/output (I/O) devices 20 are mounted on the motherboard. Two buses 16a and 16b are also provided on the motherboard 14 and connect the processor 16 to the memory modules 18 and to the input/output devices 20, respectively. A power supply 22 is connected to the motherboard 14, and a pair of cable assemblies 24a and 24b connect the motherboard to a hard drive unit 26 and a disk drive unit 28, respectively. It is understood that other components, electrical traces, electrical circuits and related devices (not shown) are provided in the chassis 12. Since these are all conventional, they will not be described in any further detail.

Figure 2:
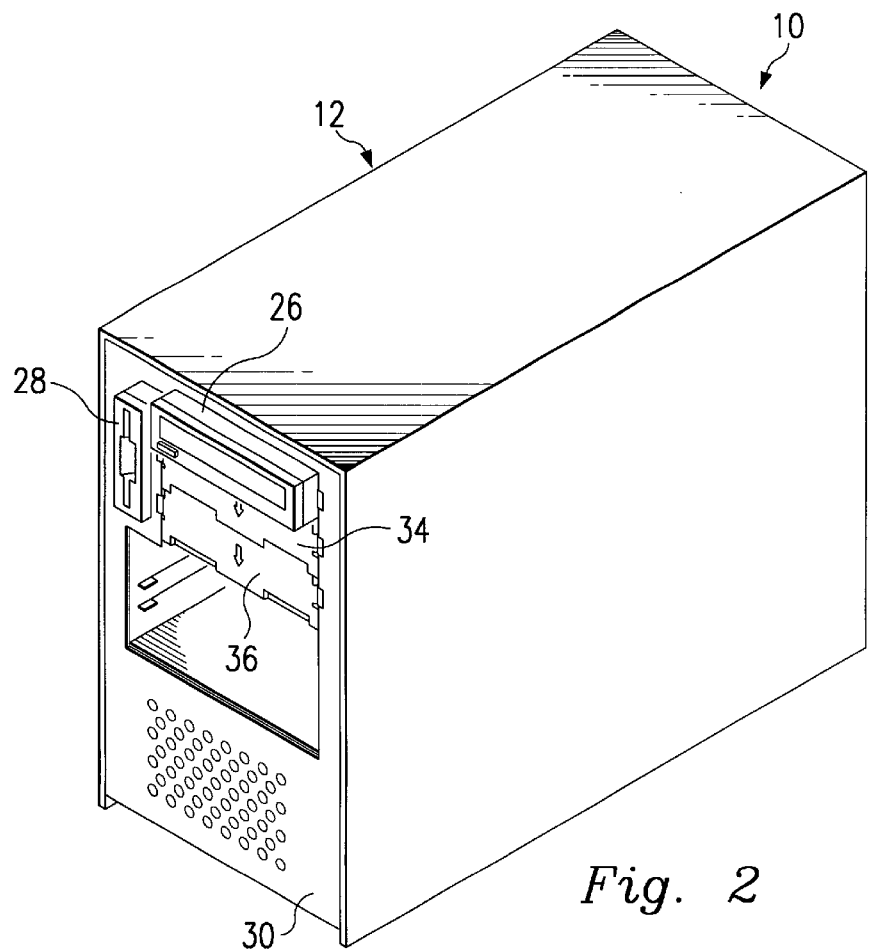
FIG. 2 is a isometric view of the computer of FIG. 1.

The chassis 12 is shown in an upright, "tower" orientation in FIG. 2 and includes a front wall, or bezel 30, which receives the two drives 26 and 28 in a conventional manner. Two openings for peripheral bays are provided through the wall 30 and are covered by two covers, or shields, 34 and 36, respectively which are shown in better detail in FIG. 3.

The shield 34 is rectangular in shape and has two snap tabs 34a and 34b formed at each end thereof. Each snap tab 34a and 34b creates a spring tension when its outer leg is pressed inwardly towards the shield. The dimensions of the shield 34 and the tabs 34a and 34b are such that the shield can be placed over its corresponding opening in the wall 30 and pressed into the opening to cause the tabs 34a and 34b to engage the corresponding portion of the wall defining the sides of the opening. Thus, the shield 34 is quickdetachably connected to the wall. The height of the shield 34 is greater than the height of its corresponding opening so that the shield overlaps the opening.

Figure 3:
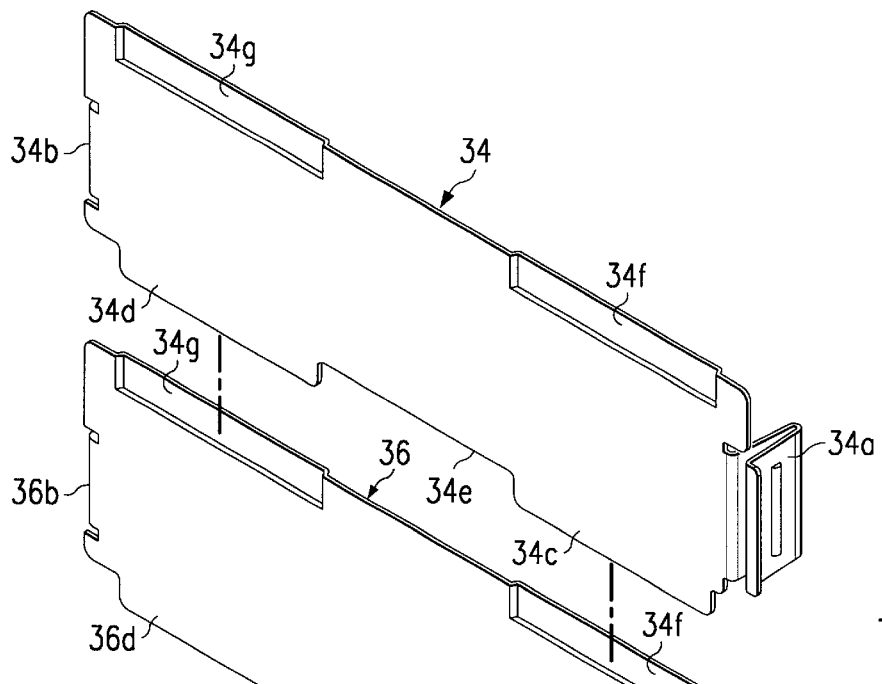
FIG. 3 is an enlarged exploded isometric view of the EMI shields of the computer of FIG. 1.

The shield 34 also has two spaced tabs 34c and 34d formed along one edge portion, which is its lower edge portion as viewed in FIG. 3, with a notch 34e being defined between the tabs. Two recessed portions 34f and 34g are also formed along the upper edge portion of the shield 34, for reasons to be described.

The shield 36 is identical to the shield 34 and, as such, has two snap tabs 36a and 36b formed at each end thereof which function in the same manner as the snap tabs 34a and 34b of the shield 34. The shield 36 also has two tabs 36c and 36d and a notch 36e formed along its lower edge portion, and two recessed portions 36e and 36f formed along its upper edge portion.

Figure 4:
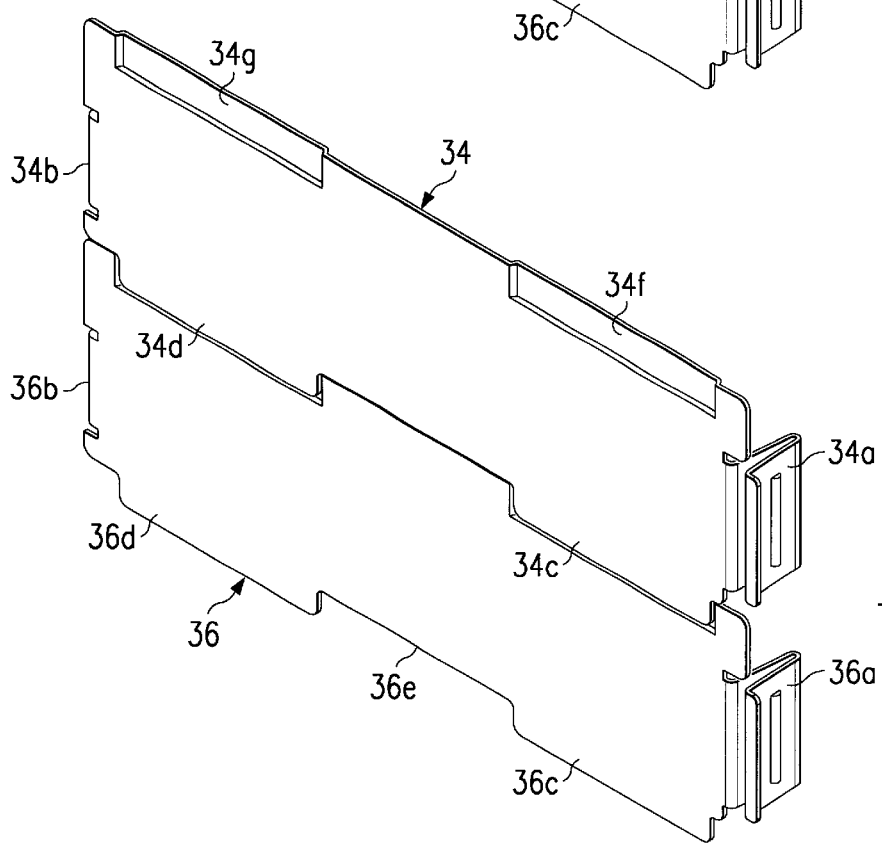
FIG. 4 is a view similar to FIG. 3 but depicting the shields of FIG. 3 in an overlapping, interlocked relationship.

The shields 34 and 36 are shown in their interlocked position in FIG. 4. In this position, the tabs 34c and 34d of the shield 34 overlap the upper edge portion of the shield 36 and extend in the recessed portions 36f and 36g of the shield 36. Also, the notch 34e of the shield 34 receives that portion of the upper edge portion of the shield 36 extending between the recessed portions 36f and 36g. Thus, the shields 34 and 36 are retained in the overlapped, interlocked relationship shown in FIG. 4.

The recessed portions 34f and 34g of the shield 34 are adapted to receive the tabs of an adjacent shield (not shown) covering an additional opening in the wall 30 extending above the opening covered by the shield 34. Also, the tabs 36c and 36d of the shield 36 are adapted to interlock with an adjacent shield (not shown) covering an additional opening in the wall 30 extending below the opening covered by the shield 36.

As a result of the foregoing, the shields 34 and 36 are retained in an overlapping, interlocked relationship, thus eliminating any slot antenna gaps occurring around each shield and between the shields, and preventing the egress of EMI emissions or radiation from the interior of the chassis 12.

It is understood that several variations may be made in the foregoing without departing from the scope of the invention.

For example, the number of shields, and therefore the number of peripheral bays covered by the shields can be varied within the scope of the invention. Also, the embodiment described above is not limited to the use of a computer in a tower orientation, but is equally applicable to other types of computers and orientations of the computers. Moreover, the embodiment described above is equally applicable to other electronic components.

Other modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A computer system comprising:
    a chassis having at least one wall;
    a memory in the chassis;
    a storage in the chassis;
    at least two peripheral bays formed in the chassis;
    at least two openings formed in the wall for providing access to the at least two bays, respectively;
    a first cover attached to the wall and extending over one of the openings, the dimensions of the first cover exceeding that of the opening so as to completely cover the opening;
    a second cover attached to the wall and extending over another opening adjacent the one opening, the dimensions of the second cover exceeding that of the opening so as to completely cover the opening and overlap with the first cover, the second cover interlocking with the first cover to prevent the egress of electromagnetic emissions from the chassis through the wall;
    the first and second covers being identical; and
    each of the first and second covers having a front surface including:
        a first edge having spaced apart edge tabs and a notch between the edge tabs; and
        a second edge opposite the first edge including spaced apart recesses shaped to receive an overlapping engagement with the spaced apart edge tabs of an adjacent edge of one of the covers.

2. The computer of claim 1 further comprising snap means formed on at least one end of each cover to attach the cover to the wall.

3. The computer of claim 2 wherein the snap means are in the form of spring tabs formed on each end of the cover and engaging a corresponding portion of the wall defining the opening.

4. The computer of claim 1 wherein the cover shields EMI emissions.

5. A method of preventing the egress of EMI emissions from a chassis of a computer chassis having at least one wall, at least two peripheral bays formed in the chassis, and at least two openings formed in the wall for providing access to the at least two bays, respectively, the method comprising:
    covering one of the openings with a cover that overlaps the opening;
    covering another opening with another cover that overlaps the other opening and the first cover, and interlocking the covers, such that said another cover overlaps the first cover on a front surface
    providing each cover with a first edge having spaced apart edge tabs and a notch between the edge tabs; and
    providing each cover with a second edge having spaced apart recesses shaped to receive an overlapping engagement with the spaced apart edge tabs of an adjacent edge of one of the covers.

6. A computer having a chassis formed by at least one wall, at least two peripheral bays formed in the chassis, and at least two openings formed in the wall for providing access to the at least two bays, respectively, comprising:
    a cover for covering one of the openings;
    an additional cover for covering the other opening, each cover overlapping its respective opening and one of the covers overlapping the other cover and interlocking with the other cover;
    the covers being identical; and
    each cover having a front surface including:
        a first edge having spaced apart edge tabs and a notch between the edge tabs; and
        a second edge opposite the first edges including spaced apart recesses shaped to receive an overlapping engagement with the spaced apart edge tabs of an adjacent edge of one of the covers.

7. The improvement of claim 6 further comprising snap means formed on at least one end of each cover to attach the cover to the wall.

8. The improvement of claim 7 wherein the snap means are in the form of spring tabs formed on each end of the cover and engaging a corresponding portion of the wall defining the opening.

* * * * *